(12) United States Patent
Fechete et al.

(10) Patent No.: US 9,367,628 B2
(45) Date of Patent: Jun. 14, 2016

(54) OBJECT RECOMMENDATION BASED UPON SIMILARITY DISTANCES

(71) Applicant: Facebook, Inc., Menlo Park, CA (US)

(72) Inventors: Dan Ionut Fechete, Mountain View, CA (US); Ming Hua, Palo Alto, CA (US); Yang Qin, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 135 days.

(21) Appl. No.: 14/147,448

(22) Filed: Jan. 3, 2014

(65) Prior Publication Data

US 2015/0193539 A1   Jul. 9, 2015

(51) Int. Cl.
*G06F 17/30* (2006.01)

(52) U.S. Cl.
CPC ................................ *G06F 17/30867* (2013.01)

(58) Field of Classification Search
CPC .................................................. G06F 17/30867
See application file for complete search history.

(56) References Cited

U.S. PATENT DOCUMENTS

| | | | | |
|---|---|---|---|---|
| 8,521,661 | B2 * | 8/2013 | Wang | G06Q 30/02 706/12 |
| 2010/0257023 | A1 | 10/2010 | Kendall et al. | |
| 2010/0281035 | A1 | 11/2010 | Carmel et al. | |
| 2011/0246574 | A1 * | 10/2011 | Lento | G06Q 10/10 709/204 |
| 2012/0158501 | A1 | 6/2012 | Zhang et al. | |
| 2012/0158851 | A1 | 6/2012 | Kelmenson et al. | |
| 2013/0311568 | A1 | 11/2013 | Wang et al. | |

OTHER PUBLICATIONS

International Searching Authority PCT Search Report, PCT/US2014/010371, mailing date Oct. 2, 2014, 5 pages.
Yehuda Koren, The BellKor Solution to the Netflix Grand Prize, 10 pages, Aug. 2009.
Andreas Töscher et al., The BigChaos Solution to the Netflix Grand Prize, 52 pages, Sep. 5, 2009.
Martin Piotte et al., The Pragmatic Theory solution to the Netflix Grand Prize, Pragmatic Theory Inc., Canada, 92 pages, Aug. 2009.
Tracy V. Wilson et al., HowStuffWorks "The Netflix Shipping System", Netflix Recommendations, downloaded on: Aug. 15, 2013 at http://electronics.howstuffworks.com/netflix2.htm, 3 pages.

(Continued)

*Primary Examiner* — Apu Mofiz
*Assistant Examiner* — Cindy Nguyen
(74) *Attorney, Agent, or Firm* — Nicholson De Vos Webster & Elliott LLP

(57) ABSTRACT

Exemplary methods, apparatuses, and systems receive a candidate object with which a user can interact within a network service. For each of a first plurality of objects with which the user has had a positive interaction, a first value representing a commonality between the candidate object and each of the first plurality of objects is determined. For each of a second plurality of objects with which a user has had a negative interaction, a second value representing a commonality between the candidate object and each of the second plurality of objects is determined. An aggregate positive distance is determined using a plurality of the first values. An aggregate negative distance is determined using a plurality of the second values. The candidate object is displayed or not displayed to the user as a recommendation based upon a difference between the aggregate positive distance and the aggregate negative distance.

20 Claims, 5 Drawing Sheets

(56) References Cited

OTHER PUBLICATIONS

Robert M. Bell et al., Modeling Relationships at Multiple Scales to Improve Accuracy of Large Recommender Systems, Research Track Paper, KDD'07, Copyright 2007 ACM, Aug. 12-15, 2007, pp. 95-104.
James Bennett et al., The Netflix Prize, Proceedings of KDD Cup and Workshop 2007, San Jose, California, Aug. 12, 2007, 4 pages.
Robert M. Bell et al., The BellKor Solution to the Netflix Prize, 2007, 15 pages.
Robert M. Bell et al., The BellKor 2008 Solution to the Netflix Prize, 2008, 21 pages.
Andreas Töscher et al., The BigChaos Solution to the Netflix Prize 2008, Nov. 25, 2008, 17 pages.
Loren Terveen et al., Beyond Recommender Systems: Helping People Help Each Other, HCI in the New Millennium, Jack Carroll, ed , Addison-Wesley, 2001, 21 pages.

* cited by examiner

OBJECT RECOMMENDATION BASED UPON SIMILARITY DISTANCES

FIELD

The various embodiments described herein relate to ranking and recommending objects within a network service. In particular, the embodiments relate to ranking and recommending objects based upon commonalities between each candidate object and one or more objects with which a user has had positive and negative interactions.

BACKGROUND

Network services enable users to interact with various objects. For example, a social networking system allows users to designate other users or entities as connections (or otherwise connect to, or form relationships with, other users or entities), contribute and interact with their connections, post media or commentary, use applications, join groups, list and confirm attendance at events, invite connections, and perform other tasks that facilitate social interaction. External applications also use the services of a social networking system to allow authenticated users to incorporate some of the above social interactions with use of the external applications. Similar interactions are a part of the user experience within other network services.

Within these interactions, users create positive and negative feedback with regard to objects represented with the social networking system. For example, a user may take an action indicate that she liked a particular book (i.e., positive feedback). Additionally, the user may decline a recommendation within the network service that she may be interested in another book (i.e., negative feedback).

SUMMARY OF THE DESCRIPTION

Exemplary methods, apparatuses, and systems receive a candidate object with which a user can interact within a network service. For each of a first plurality of objects with which the user has had a positive interaction, a first value representing a commonality between the candidate object and each of the first plurality of objects is determined. For each of a second plurality of objects with which a user has had a negative interaction, a second value representing a commonality between the candidate object and each of the second plurality of objects is determined. An aggregate positive distance is determined using a plurality of the first values. An aggregate negative distance is determined using a plurality of the second values. The candidate object is displayed or not displayed to the user as a recommendation based upon a difference between the aggregate positive distance and the aggregate negative distance.

In one embodiment, the aggregate positive distance is determined by dividing a sum or average of the plurality of the first values by a first outlier value, the first outlier value corresponding to an object with which the user has had a positive interaction and having less in common with the candidate object than each of the first plurality of objects. Similarly, the aggregate negative distance is determined by dividing a sum or average of the plurality of the second values by a second outlier value, the second outlier value corresponding to an object with which the user has had a negative interaction and having less in common with the candidate object than each of the second plurality of objects.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein determine whether or not a candidate object should be displayed to a user as a recommendation. Using a user's history of positive and negative interactions with other objects, embodiments determine if the candidate object has more in common with the positive objects or the negative objects. As a result, the network service is able to provide personalized recommendations for the user based upon the user's demonstrated taste rather than what is simply popular. Additionally, accounting for the breadth of the user's history of interactions enables the network service to recommend a heterogeneous set of candidate objects.

Figure 1:
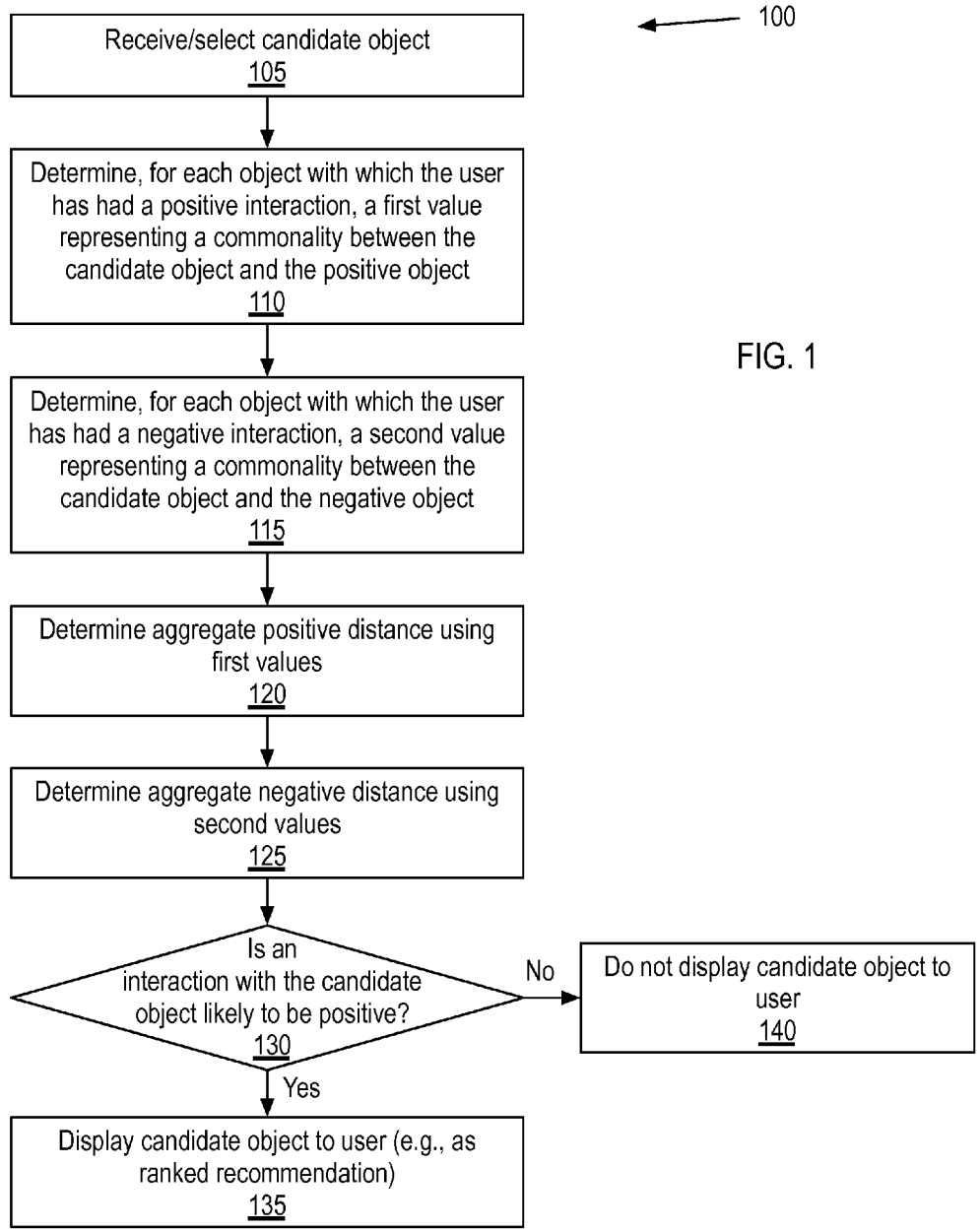
FIG. 1 is a flow chart illustrating an exemplary method of determining whether a candidate object is to be displayed as a recommendation.

FIG. 1 is a flow chart illustrating exemplary method 100 of determining whether a candidate object is to be displayed as a recommendation. At block 105, a network service receives or selects a candidate object. As used herein, objects (and, therefore, candidate objects) refer to items with which a user can interact within a network service. For example, objects within a social network include users, entities, media (of various forms), representations of tangible items (e.g., that may be purchased), organizations, public personas, etc. In one embodiment, candidate objects are selected or received based upon categories or industry verticals. For example, a user may be viewing, rating, or otherwise interacting with objects representing music (artists/bands, albums/songs, etc.) and the network service receives or selects a music object as a candidate for recommendation. Exemplary categories/verticals include music, television, movies, books, sports, fashion, places, technology products, automotive, finance, etc.

In one embodiment, the network service selects candidate objects. For example, candidate objects for a user of a network service may be selected based upon popularity within the general population of one or more network services, popularity within a particular demographic of the user within one or more network services, positive feedback from users connected to or otherwise associated with the user within one or more network services, an association with or similarity to objects in the user's network service history within one or more network services, the user's interests listed or otherwise expressed within one or more network services, etc. Alternatively, the network service receives candidate objects selected by another network service or tool.

Figure 2:
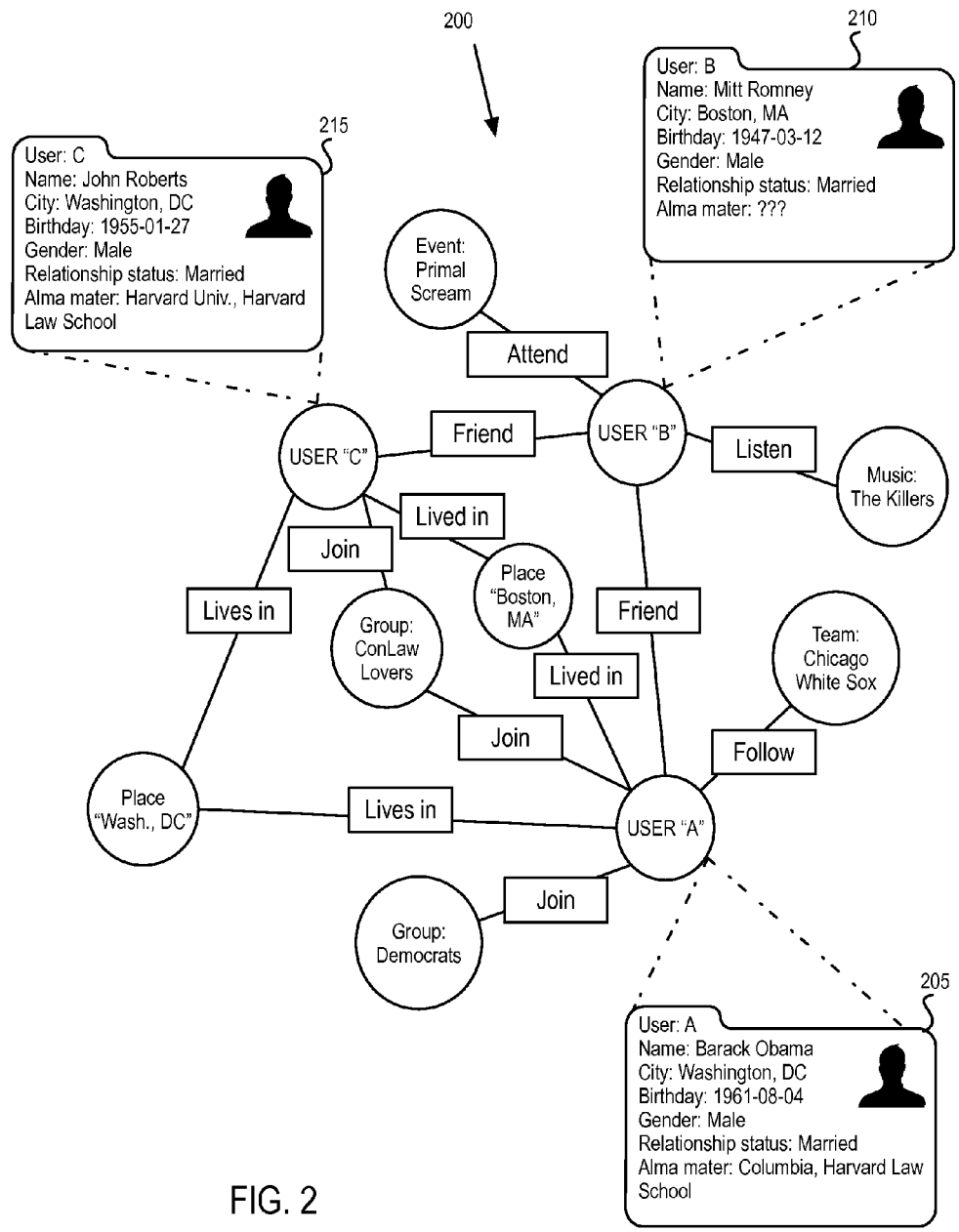
FIG. 2 illustrates an exemplary graph of user actions with respect to objects within the social network.

In one embodiment, the network service utilizes social network data for the above-described selection of candidate objects. FIG. 2 illustrates exemplary graph 200 of social network data. In graph 200, objects are illustrated as circles and actions are illustrated as labeled connections between circles. Developers of the social network or corresponding social network applications define actions to represent different ways that users may interact with the social network and/or their applications. As users perform actions, connections are made between users and objects. For example, User A has performed a number of actions within the social network, indicating that he previously lived in Boston, currently lives in Washington D.C., joined groups for Democrats and ConLaw Lovers, is following the White Sox, and is friends with User B. User B and User C have also performed a number of actions with respect to objects within graph 200.

In one embodiment, users are able to add demographic information to user profiles 205-215. In one embodiment, for demographic information that has not been entered by a user, a social network application generates an estimate based upon the user's actions, connections, and/or actions of connections. For example, User B has not entered an alma mater into user profile 210. A social network application may determine from User B's contacts, activities, cities of residence, etc. that User B's likely alma mater is one or both of Brigham Young University and Harvard University. In one embodiment, the user profiles 205-210 include additional information, such as relationships to other users, places where the user has worked, user interests, etc.

In one embodiment, demographic data further includes a weight or score indicating an affinity between a user and an object. For example, repeated user action with one object may indicate a stronger affinity for said object than another object with which the user has limited interaction. First degree connections, e.g., the friendship between User A and User B, may indicate a stronger affinity than second degree connections, e.g., User A is friends with User B, who is friends with User C, creating a second degree connection between User A and User C. An indication that two users are married may indicate a stronger affinity than if two users are friends. Additionally, temporal and geographic proximity of actions/users are other exemplary indicators of affinity.

The illustrated objects, connections, profiles, and affinity values are exemplary network service data used for selecting candidate objects in the manner described above. For example, User B listened to music by The Killers. As a result of User A being a friend of (or otherwise connected to) User B, music by The Killers may be selected as a candidate object to potentially be recommended to User A. In one embodiment, users may select privacy settings to control what network service data is shared, with whom the data is shared, and/or what data used for selecting candidate objects.

Returning to FIG. 1, at block 110, the network service determines, for each object with which the user has had a positive interaction, a first value representing a commonality between the candidate object and the positive object. Similarly, at block 115, the network service determines, for each object with which the user has had a negative interaction, a second value representing a commonality between the candidate object and the negative object. For example, the network service may maintain or receive (e.g., from a third party application) a history of objects with which the user has interacted. The network service maintains or receives the history in lists of objects with which the user has had a positive interaction and objects with which the user has had a negative interaction. For example, positive and negative interactions may be stored in graph 200 described above. Objects with which the user has had a positive interaction are referred to herein as "positive objects." Objects with which the user has had a negative interaction are referred to herein as "negative objects." Exemplary positive interactions include liking, watching, listening, becoming a fan of, following, sharing, commenting on, giving a positive rating to, adding to a wish list, clicking-through (e.g., following a link for an advertisement to a page for the advertised product/service), and purchasing an object. Exemplary negative interactions include ignoring or declining (e.g., a recommended or shared object), viewing and selecting a similar object (e.g., purchasing a competitive product after viewing the current object), giving a negative rating to, minimizing an object (e.g., minimizing or otherwise causing an advertisement to no longer be displayed), and commenting on an object. In one embodiment, the network service applies sentiment analysis, e.g., by parsing the content of a comment on an object to determine if the comment is to be treated as a positive interaction or a negative interaction. For example, the parsing may include searching for positive or negative keywords, phrases, or emotional indicators, such as emoticons. In one embodiment, the network service stores a mapping between interactions to positive and negative assignments. Using the assignments, the network service maps particular user interactions and their corresponding objects to lists of positive objects and negative objects.

As used herein, the first and second values are also referred to as distance values. A small distance value is an indication that the candidate object and positive/negative object are "close" to one another and are more likely to be subject to similar interactions. A large distance value is an indication that the candidate object and positive/negative object are "far" from one another are less likely to be subject to similar interactions. Alternatively, large first/second values indicate that objects are more likely to be subject to similar interactions and small first/second values indicate that objects are less likely to be subject to similar interactions. For the simplicity of explanation throughout this description, the use of distances will be used to describe the likelihood of objects being subject to similar interactions.

Distance values are determined based upon commonalities between the candidate object and each object with which the user has had a positive or negative interaction. Exemplary commonalities include a number of users (within a general population or within a particular demographic) having a positive interaction with both the candidate object and the positive object, a number of users (within a general population or within a particular demographic) having a negative interaction with both the candidate object and the negative object, and common metadata between the candidate object and the positive/negative object (e.g., two films by the same director would have common director metadata). While positive and negative interactions are discussed generally with respect to distance values, in one embodiment, each type of positive/negative interaction is treated as a separate commonality. For example, a user may like, share, and comment upon a single object. The network service would treat each of these three interactions as separate commonalities. Similarly, each common metadata item may be treated as a separate commonality.

In one embodiment, a value is assigned to each commonality and the commonalities are summed. For example, the network service assigns a higher value to a commonality corresponding to a higher number of users with a common interaction with the objects than to a commonality corresponding to a lower number of users with a common interaction with the objects. Additionally, the values for each commonality may be weighted. For example, particular types of commonalities or particular instances of commonalities may be given more or less weight than other commonalities. The values for each commonality are summed with or multiplied by a weight value to give more or less influence to the commonality when considered with other commonalities. Each commonality between the candidate object and the positive/negative object contributes a value/weighted value to the overall distance value.

In one embodiment, the weight values for commonalities are selected in response to determining a type for the candidate object. The network service maps the object type to set of weights to be applied to commonalities. For example, a common author may be given greater weight for a book object type while a common lead actor may be given a greater weight for a movie object type.

Figure 3:
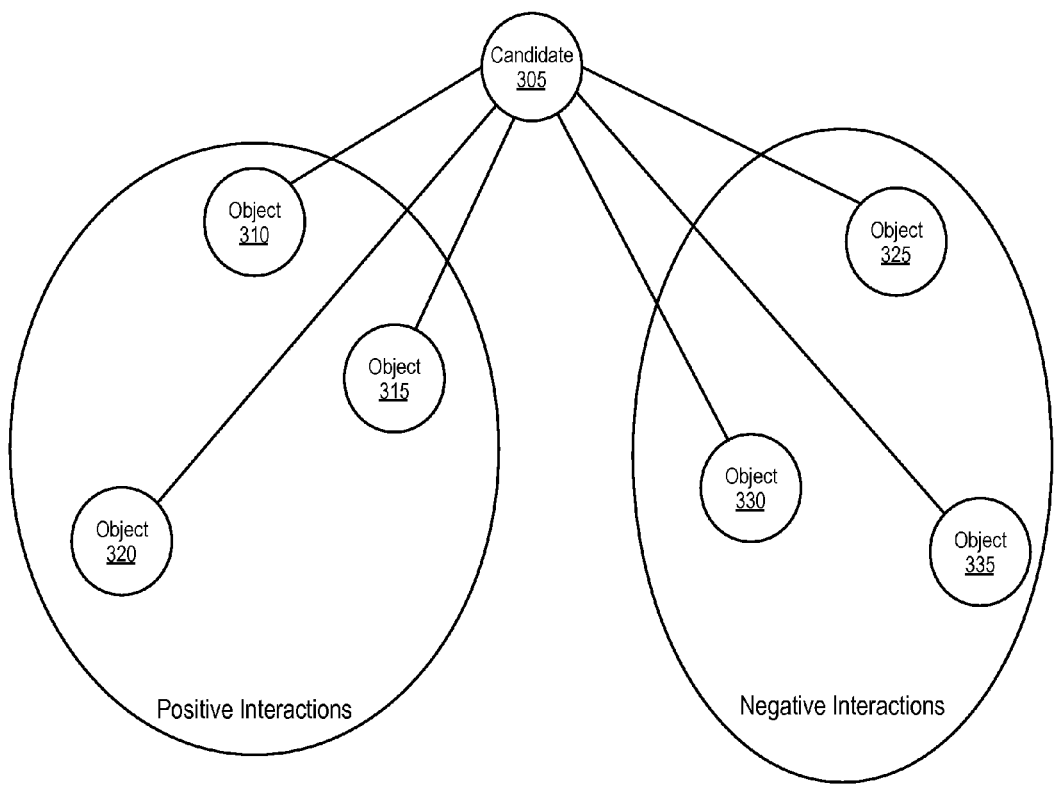
FIG. 3 illustrates exemplary positive and negative distances between a candidate object and objects with which a user has had positive or negative interactions.

FIG. 3 illustrates exemplary positive and negative distances between a candidate object and objects with which a user has had positive or negative interactions. The network service received or selected candidate object 305 and calculated distance values (as described above) between candidate object and each of positive objects 310-315 and negative objects 325-335 (as represented by the lines between candidate object 305 and positive/negative objects 310-335).

Returning to FIG. 1, at block 120, the network service determines an aggregate positive distance using a plurality of the first/positive distance values described above. Similarly, at block 125, the network service determines an aggregate negative distance using a plurality of the second/negative distance values described above. In one embodiment, the network service selects a number of first distance values and an equal number of negative distance values. For example, the network service determines the top K distance values in each list representing the K positive objects and K negative objects with the most in common with the candidate object (as compared to other positive/negative objects). In one embodiment, the network service stores a mapping of various object types to values for K. The network service selects the value for the number, K, in response to determining a type for the candidate object and based upon the mapping.

In one embodiment, the network service determines the aggregate positive distance by calculating a sum or average of the plurality of the first values. For example, for K positive distance values x1 through xK, an aggregate positive distance value is equal to x1+x2+ ... +xK or $$\frac{x1 + x2 + \ldots + xK}{K}.$$

Similarly, for K second/negative distance values y1 through yK, an aggregate negative distance value is equal to y1+y2+ ... +yK or $$\frac{y1 + y2 + \ldots + yK}{K}.$$

While K is used for both the aggregate positive distance and the aggregate negative distance, when the network service calculates an average of the plurality of first values and an average of the plurality of second values, the network service may use a different number of first values than the number of second values.

In another embodiment, the network service determines the aggregate positive distance by dividing the sum or average of the plurality of the first values by a first outlier value. The first outlier value corresponds to an object with which the user has had a positive interaction and has less in common with the candidate object than each of the first plurality of objects. Similarly, the network service determines the aggregate negative distance by dividing the sum or average of the plurality of the first values by a second outlier value. The second outlier value corresponds to an object with which the user has had a negative interaction and has less in common with the candidate object than each of the second plurality of objects. For example, referring again to FIG. 3, an exemplary value of K is 2. The network service selects objects 310 and 315 as the top K positive objects and objects 325 and 330 as the top K negative objects. Object 320 is a positive outlier that has less in common with candidate object 305 than positive objects 310 and 315. Object 335 is a negative outlier that has less in common with candidate object 305 than negative objects 325 and 330.

In one embodiment, the network service selects the outlier with the greatest distance value (i.e., the least in common with the candidate object). For example, for K positive distance values x1 through xK, an aggregate positive distance value is equal to $$\frac{x1 + x2 + \ldots + xK}{x\max}$$

or $$\frac{\left(\frac{x1 + x2 + \ldots + xK}{K}\right)}{x\max}.$$

Similarly, for K negative values y1 through yK, an aggregate negative distance value is equal to $$\frac{y1 + y2 + \ldots + yK}{y\max}$$

or $$\frac{\left(\frac{y1 + y2 + \ldots + yK}{K}\right)}{y\max}.$$

Using an outlier value, the network service accounts for the breadth of the user's history of interactions in calculating aggregate distance values. As a result, the aggregate distance values may more accurately represent a heterogeneous set of candidate objects. In an alternate embodiment, the network service selects outliers based upon distance value and/or most recent interactions. For example, a recent interaction with a large distance value may be an indication of changing taste.

At block 130, the network service determines if a user interaction with the candidate object is more likely to be positive or negative. In one embodiment, the network service determines if the aggregate positive value is smaller or larger than the aggregate negative value, e.g., as determined by performing a subtraction or division operation between or otherwise comparing the aggregate values. For example, if the aggregate positive value is smaller than the aggregate negative value, the candidate object is more likely to be subject to a positive interaction than a negative interaction. Using the exemplary formulas above, when $$\frac{\left(\frac{x1+x2+\ldots+xK}{K}\right)}{x\max} < \frac{\left(\frac{y1+y2+\ldots+yK}{K}\right)}{y\max},$$

the candidate object is likely to be subject to a positive interaction. In an alternate embodiment, the network service determines if the aggregate positive value is smaller than the aggregate negative value by a threshold amount. For example, when $$\frac{\left(\frac{x1+x2+\ldots+xK}{K}\right)}{x\max} < C\frac{\left(\frac{y1+y2+\ldots+yK}{K}\right)}{y\max}$$

or $$\frac{\left(\frac{x1+x2+\ldots+xK}{K}\right)}{x\max} < \frac{\left(\frac{y1+y2+\ldots+yK}{K}\right)}{y\max} - C,$$

the candidate object is likely to be subject to a positive interaction. In one embodiment, the network service stores a mapping of various object types to values for C. The network service selects the value for the threshold, C, in response to determining a type for the candidate object and based upon the mapping.

As described above, the examples set forth herein are based upon an assumption that small distance values represent objects that are likely to be subject to similar interactions. If, however, large distance values represent objects that are likely to be subject to similar interactions, the comparisons above would be altered accordingly. For example, the network service would determine, if the aggregate positive value is larger than the aggregate negative value, the candidate object is more likely to be subject to a positive interaction than a negative interaction.

In one embodiment, one or more outlying first or second values are omitted from the determination of the aggregate positive and negative distances. For example, objects beyond a threshold distance from the candidate object may be omitted from the positive or negative objects. In such an embodiment, the maximum outlier (xmax or ymax described above) is selected from outliers within the threshold distance.

If the candidate object is more likely to be subject to a positive interaction than a negative interaction, at block 135, the network service displays the candidate object to the user. In one embodiment, method 100 is repeated for a plurality of candidate objects. In such an embodiment, candidate objects are displayed in a ranked order. For example, those candidate objects that are determined to be more likely to be subject to a positive interaction may be displayed an order from the candidate object with the smallest aggregate positive value to the candidate object with the largest aggregate positive value.

If the candidate object is more likely to be subject to a negative interaction than a positive interaction, at block 140, the network service determines not to display the candidate object to the user. As described above, method 100 may be repeated for a plurality of candidate objects.

Figure 4:
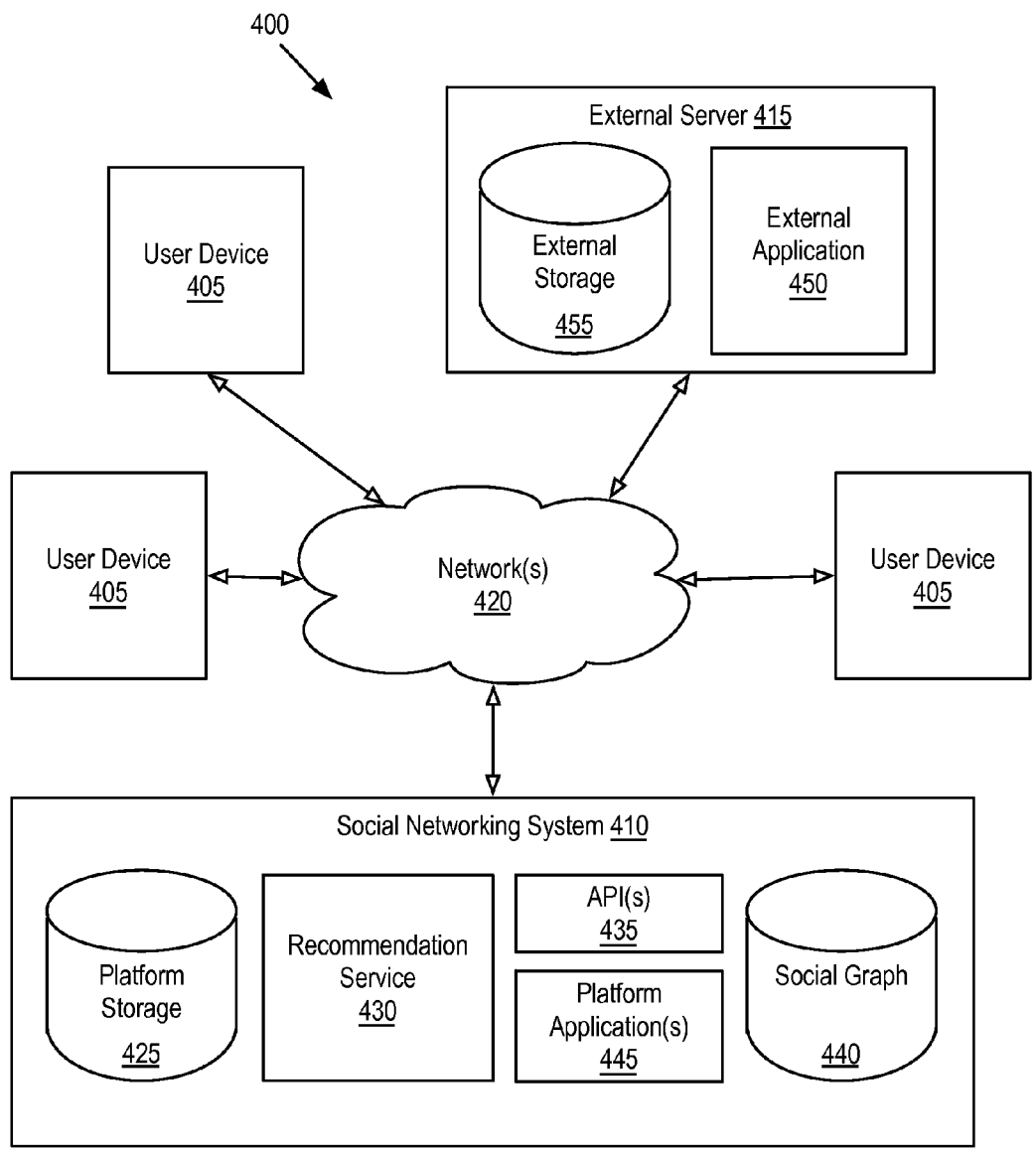
FIG. 4 illustrates, in block diagram form, an exemplary social network.

FIG. 4 illustrates, in block diagram form, an exemplary network service 400, such as a social network. Social network 400 includes user devices 405, social networking system 410, and external server 415 coupled to one or more networks 420. A user interacts with the social networking system 410 using a user device 405, such as a personal computer or a mobile phone. For example, the user device 405 communicates with the social networking system 410 via an application such as a web browser or native application. Typical interactions between the user device 405 and the social networking system 410 include operations such as viewing profiles of other users of the social networking system 410, contributing and interacting with media items, joining groups, listing and confirming attendance at events, checking in at locations, liking certain pages/posts, creating pages, and performing other tasks that facilitate social interaction, as described herein.

The social networking system 410 includes platform storage 425, a recommendation service 430, one or more application programming interfaces (API's) 435, a social graph 440 (e.g., as illustrated in FIG. 3), and one or more platform applications 445. Platform storage 425 stores user preferences/settings, profile data, interaction data, object metadata, demographic data, etc. Exemplary platform applications 445 include the platform for social interactions (e.g., publishing posts, pictures, etc.) as well as social games, messaging services, and any other application that uses the social platform provided by the social networking system 410.

In one embodiment, method 100 described above is performed by the recommendation service 430 and/or a platform application 445, interaction data, object metadata, demographic data, etc. is received from platform storage 425 and/or the social graph 440, and the mappings are stored in platform storage 425. Alternatively, one or more of the methods and/or data is performed/stored external to the social networking system 410.

One or more API's 435 enable external applications 450 to work with the social networking system 410. For example, an external application 450 utilizes an API 435 to authenticate a user based upon the user's social networking log in username and password. Additionally, an external application 450 utilizes one or more API's 435 to run the application within the platform application 430, to publish a post to the platform application, to access the user's social network connections, etc. In one embodiment, at least a portion of method 100 described above is performed by an external application 450 and data is received from and/or stored in one or both of external storage 455 or in platform storage 425. For example, a user may grant an external application 450 with permission to interact with network service 400 on behalf of the user via an API 435 and/or plugin within the external application 450. Using an API 435, external application 450 is able to obtain and/or provide user information, object information, relationships between users and objects, etc. The external application 450 may receive or provide positive and negative interaction data or other sentiment data (e.g., interactions with individual objects or otherwise) from/to the network service based upon user interactions with data objects. The user interactions may be performed within the network service 400 or outside of the network service 400 (e.g., within a webpage external to network service 400). In one embodiment, external user interactions occur via a network service plugin, which may be implemented as an iframe within the external webpage. In one embodiment, the network service 400 parses the sentiment data received from an external application 450 and determines how to apply the sentiment data to individual objects. For example, the sentiment data may provide positive and negative indications for a user with regard to categories of objects and the network service 400 determines which individual objects fall within those categories.

Figure 5:
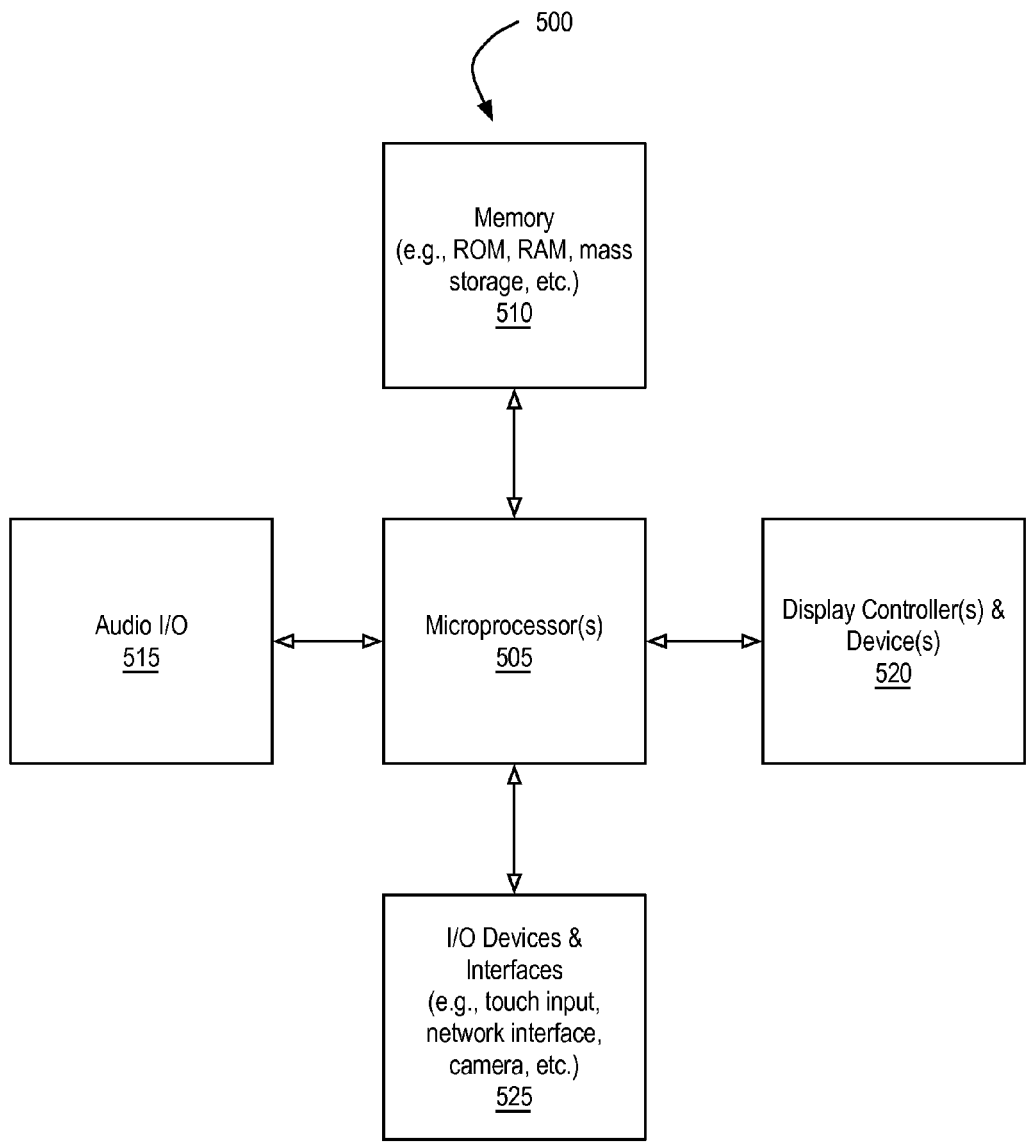
FIG. 5 illustrates, in block diagram form, an exemplary processing system to rank and recommend objects within a social network.

FIG. 5 illustrates, in block diagram form, an exemplary processing system 500 to rank and recommend objects within a social network. Data processing system 500 includes one or more microprocessors 505 and connected system components (e.g., multiple connected chips). Alternatively, the data processing system 500 is a system on a chip.

The data processing system 500 includes memory 510, which is coupled to the microprocessor(s) 505. The memory 510 may be used for storing data, metadata, and programs for execution by the microprocessor(s) 505. The memory 510 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 510 may be internal or distributed memory.

The data processing system 500 also includes an audio input/output subsystem 515 which may include a microphone and/or a speaker for, for example, playing back music or other audio, receiving voice instructions to be executed by the microprocessor(s) 505, playing audio notifications, etc. A display controller and display device 520 provides a visual user interface for the user.

The data processing system 500 also includes one or more input or output ("I/O") devices and interfaces 525, which are provided to allow a user to provide input to, receive output from, and otherwise transfer data to and from the system. These I/O devices 525 may include a mouse, keypad or a keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 500.

The I/O devices and interfaces 525 may also include a connector for a dock or a connector for a USB interface, FireWire, Thunderbolt, Ethernet, etc. to connect the system 500 with another device, external component, or a network. Exemplary I/O devices and interfaces 525 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect the data processing system 500 with another device, external component, or a network and receive stored instructions, data, tokens, etc.

It will be appreciated that one or more buses, may be used to interconnect the various components shown in FIG. 5.

The data processing system 500 is an exemplary representation of one or more of user's device 405, at least a portion of the social networking system 410, or the external server 415. The data processing system 500 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, the data processing system 500 may be a network computer, server, or an embedded processing device within another device or consumer electronic product. As used herein, the terms computer, device, system, processing system, processing device, and "apparatus comprising a processing device" may be used interchangeably with the data processing system 500 and include the above-listed exemplary embodiments.

It will be appreciated that additional components, not shown, may also be part of the system 500, and, in certain embodiments, fewer components than that shown in FIG. 5 may also be used in a data processing system 500. It will be apparent from this description that aspects of the inventions may be embodied, at least in part, in software. That is, the computer-implemented method 100 may be carried out in a computer system or other data processing system 410/415/500 in response to its processor or processing system 505 executing sequences of instructions contained in a memory, such as memory 510 or other non-transitory machine-readable storage medium. The software may further be transmitted or received over a network (not shown) via a network interface device 525. In various embodiments, hardwired circuitry may be used in combination with the software instructions to implement the present embodiments. Thus, the techniques are not limited to any specific combination of hardware circuitry and software, or to any particular source for the instructions executed by the data processing system 500.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing a Field-Programmable Gate Array (FPGA), Application-Specific Integrated Circuit (ASIC), a processor, a computer, or a computer system, including a networked computer system. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
receiving a candidate object with which a user can interact within a network service;
determining, for each of a first plurality of objects with which the user has had a positive interaction, a first value representing a commonality between the candidate object and each of the first plurality of objects;
determining, for each of a second plurality of objects with which a user has had a negative interaction, a second value representing a commonality between the candidate object and each of the second plurality of objects;
determining an aggregate positive distance using a plurality of the first values, wherein the aggregate positive distance is determined by dividing a sum or average of the plurality of the first values by a first outlier value, the first outlier value corresponding to an object with which the user has had a positive interaction and having less in common with the candidate object than each of the first plurality of objects;
determining an aggregate negative distance using a plurality of the second values, wherein the aggregate negative distance is determined by dividing a sum or average of the plurality of the second values by a second outlier value, the second outlier value corresponding to an object with which the user has had a negative interaction and having less in common with the candidate object than each of the second plurality of objects; and
recommending the candidate object to the user in response to determining from a difference between the aggregate positive distance and the aggregate negative distance that the candidate object is more in common with objects with which a user has had a positive interaction than objects with which a user has had a negative interaction.

2. The computer-implemented method of claim 1, further comprising:
selecting an object to be the candidate object based upon positive feedback from one or more users connected to the user within the network service.

3. The computer-implemented method of claim 1, wherein each first value is based upon a combination of third and fourth values, the third value representing a commonality in metadata between the candidate object and a corresponding object within the first plurality of objects, the fourth value representing one or more other users having a positive interaction with both the candidate object and the corresponding object within the first plurality of objects, and wherein each second value is based upon a combination of fifth and sixth values, the fifth value representing a commonality in metadata between the candidate object and a corresponding object within the second plurality of objects, the sixth value representing one or more other users having a negative interaction with both the candidate object and the corresponding object within the second plurality of objects.

4. The computer-implemented method of claim 3, further comprising:

modifying each of the third values to the result of a mathematical operation between the determined third values and a first weighting value;
modifying each of the fourth values to the result of a mathematical operation between the determined fourth values and a second weighting value;
modifying each of the fifth values to the result of a mathematical operation between the determined fifth values and a third weighting value; and
modifying each of the sixth values to the result of a mathematical operation between the determined sixth values and a fourth weighting value.

5. The computer-implemented method of claim 4, further comprising:
selecting one or more of the weighting values based upon an object type for the candidate object.

6. The computer-implemented method of claim 1, wherein a number of objects within the first plurality of objects is limited to a number of objects determined to have a greatest amount in common with the candidate object.

7. The computer-implemented method of claim 6, wherein the number of objects within the first plurality of objects is based upon an object type for the candidate object.

8. The computer-implemented method of claim 1, wherein the candidate object is recommended to the user in response to determining that the aggregate positive value is smaller than the aggregate negative value by a threshold amount or that the aggregate positive value is greater than the aggregate negative value by a threshold amount.

9. The computer-implemented method of claim 8, wherein the threshold amount is based upon an object type for the candidate object.

10. The computer-implemented method of claim 1, wherein one or more outlying first or second values are omitted from the determination of the aggregate positive and negative distances.

11. A non-transitory computer-readable medium storing instructions which, when executed by one or more processors in a processing device, cause the processing device to perform a method comprising:
receiving a candidate object with which a user can interact within a network service;
determining, for each of a first plurality of objects with which the user has had a positive interaction, a first value representing a commonality between the candidate object and each of the first plurality of objects;
determining, for each of a second plurality of objects with which a user has had a negative interaction, a second value representing a commonality between the candidate object and each of the second plurality of objects;
determining an aggregate positive distance using a plurality of the first values, wherein the aggregate positive distance is determined by dividing a sum or average of the plurality of the first values by a first outlier value, the first outlier value corresponding to an object with which the user has had a positive interaction and having less in common with the candidate object than each of the first plurality of objects;
determining an aggregate negative distance using a plurality of the second values, wherein the aggregate negative distance is determined by dividing a sum or average of the plurality of the second values by a second outlier value, the second outlier value corresponding to an object with which the user has had a negative interaction and having less in common with the candidate object than each of the second plurality of objects; and recommending the candidate object to the user in response to determining from a difference between the aggregate positive distance and the aggregate negative distance that the candidate object is more in common with objects with which a user has had a positive interaction than objects with which a user has had a negative interaction.

12. The non-transitory computer-readable medium of claim 11, the method further comprising:
selecting an object to be the candidate object based upon positive feedback from one or more users connected to the user within the network service.

13. The non-transitory computer-readable medium of claim 11, wherein each first value is based upon a combination of third and fourth values, the third value representing a commonality in metadata between the candidate object and a corresponding object within the first plurality of objects, the fourth value representing one or more other users having a positive interaction with both the candidate object and the corresponding object within the first plurality of objects, and wherein each second value is based upon a combination of fifth and sixth values, the fifth value representing a commonality in metadata between the candidate object and a corresponding object within the second plurality of objects, the sixth value representing one or more other users having a negative interaction with both the candidate object and the corresponding object within the second plurality of objects.

14. The non-transitory computer-readable medium of claim 13, the method further comprising:
modifying each of the third values to the result of a mathematical operation between the determined third values and a first weighting value;
modifying each of the fourth values to the result of a mathematical operation between the determined fourth values and a second weighting value;
modifying each of the fifth values to the result of a mathematical operation between the determined fifth values and a third weighting value; and
modifying each of the sixth values to the result of a mathematical operation between the determined sixth values and a fourth weighting value.

15. The non-transitory computer-readable medium of claim 14, the method further comprising:
selecting one or more of the weighting values based upon an object type for the candidate object.

16. The non-transitory computer-readable medium of claim 11, wherein a number of objects within the first plurality of objects is limited to a number of objects determined to have a greatest amount in common with the candidate object.

17. The non-transitory computer-readable medium of claim 16, wherein the number of objects within the first plurality of objects is based upon an object type for the candidate object.

18. The non-transitory computer-readable medium of claim 11, wherein the candidate object is recommended to the user in response to determining that the aggregate positive value is smaller than the aggregate negative value by a threshold amount or that the aggregate positive value is greater than the aggregate negative value by a threshold amount.

19. The non-transitory computer-readable medium of claim 18, wherein the threshold amount is based upon an object type for the candidate object.

20. The non-transitory computer-readable medium of claim 11, wherein one or more outlying first or second values are omitted from the determination of the aggregate positive and negative distances.

* * * * *